United States Patent
Hurtevent et al.

(10) Patent No.: US 10,106,722 B2
(45) Date of Patent: Oct. 23, 2018

(54) USE OF A COPOLYMER MADE FROM STYRENE SULPHONIC ACID TO INHIBIT OR SLOW THE FORMATION OF SULPHIDE DEPOSITS

(71) Applicants: TOTAL SA, Courbevoie (FR); UNIVERSITE LYON 1, Villeurbanne (FR); CENTRE NATIONAL DE LA RECHERCHE SCIENTIFIQUE-CNRS-, Paris (FR)

(72) Inventors: Christian Hurtevent, Pau (FR); Salima Baraka-Lokmane, Pau (FR); John-Richard Ordonez-Varela, Lons (FR); Olivier Tillement, Fontaines Saint-Martin (FR); Fabien Rossetti, Lyons (FR); Mahmoud Ould Metidji, Marseilles (FR)

(73) Assignees: TOTAL SA, Courbevoie (FR); UNIVERSITE LYON 1, Villeurbanne (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 0 days.

(21) Appl. No.: 15/106,610

(22) PCT Filed: Dec. 19, 2014

(86) PCT No.: PCT/FR2014/053442
§ 371 (c)(1),
(2) Date: Jun. 20, 2016

(87) PCT Pub. No.: WO2015/092311
PCT Pub. Date: Jun. 25, 2015

(65) Prior Publication Data
US 2016/0333251 A1     Nov. 17, 2016

(30) Foreign Application Priority Data

Dec. 20, 2013   (FR) .................................. 13 63289

(51) Int. Cl.
*C09K 8/54*          (2006.01)
*C09K 8/532*         (2006.01)
(Continued)

(52) U.S. Cl.
CPC .............. *C09K 8/532* (2013.01); *C08F 12/30* (2013.01); *E21B 37/06* (2013.01)

(58) Field of Classification Search
CPC ........... C09K 8/524; C09K 8/532; C09K 8/88
(Continued)

(56) References Cited

U.S. PATENT DOCUMENTS

| 5,171,459 A | 12/1992 | Kaplan |
| 7,159,655 B2 * | 1/2007 | Ke ......................... C09K 8/528 166/279 |

(Continued)

FOREIGN PATENT DOCUMENTS

| CA | 2758686 A1 | 5/2013 |
| FR | 2803304 A1 | 7/2001 |
| GB | 2448442 A | 10/2008 |

OTHER PUBLICATIONS

Apr. 15, 2015 International Search Report issued in Patent Application No. PCT/FR2014/053442.
(Continued)

*Primary Examiner* — Zakiya W Bates
*Assistant Examiner* — Ashish K Varma
(74) *Attorney, Agent, or Firm* — Oliff PLC

(57) ABSTRACT

A copolymer containing a unit including an optionally neutralized styrene sulphonic acid unit and a unit containing at least one optionally neutralized (poly)carboxylic acid unit
(Continued)

Figure 4:
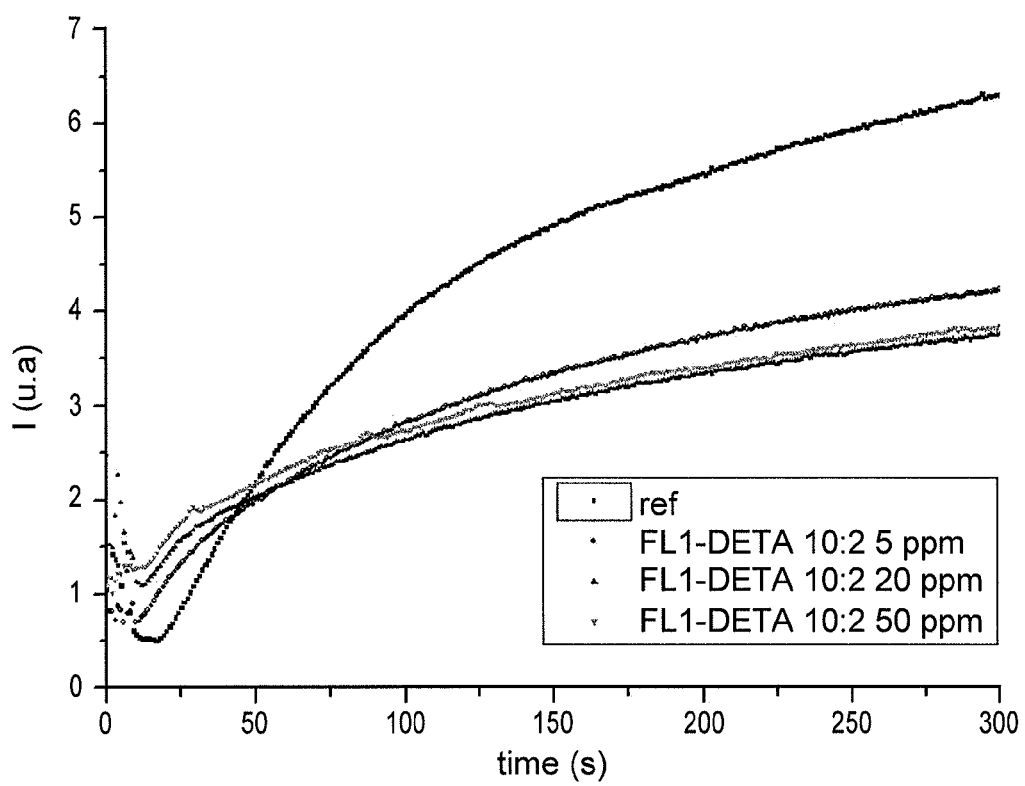

GC spectrum of F11 before (dotted line) and after (solid line) ageing or a (poly)amido-amine unit, to inhibit or slow the formation of sulphide deposits during the extraction of gas or oil. It also relates to a method to inhibit or slow the formation of sulphide deposits during the extraction of gas or oil, including the injection of a fluid containing the abovementioned copolymer into a wellbore, a subterranean formation or a gas or oil well.

9 Claims, 6 Drawing Sheets

(51) Int. Cl.
*C08F 12/30* (2006.01)
*E21B 37/06* (2006.01)

(58) Field of Classification Search
USPC .......................................................... 166/304
See application file for complete search history.

(56) References Cited

U.S. PATENT DOCUMENTS

| 7,398,824 | B1 | 7/2008 | Wang et al. |
| 8,653,008 | B2* | 2/2014 | Selle ................ C09K 8/528 |
| | | | 166/308.6 |
| 2009/0143252 | A1 | 6/2009 | Lehmann et al. |
| 2011/0124533 | A1* | 5/2011 | Notte ................ C02F 5/12 |
| | | | 507/235 |

OTHER PUBLICATIONS

Apr. 15, 2015 Written Opinion issued in Patent Application No. PCT/FR2014/053442.
Jordan, M.M et al., "Inhibition of Lead and Zinc Sulphide Scale Deposits Formed during Production from High Temperature Oil and Condensate Reservoirs.", SPE Asia Pacific Oil and Gas Condference and Exhibition, (2000).

* cited by examiner

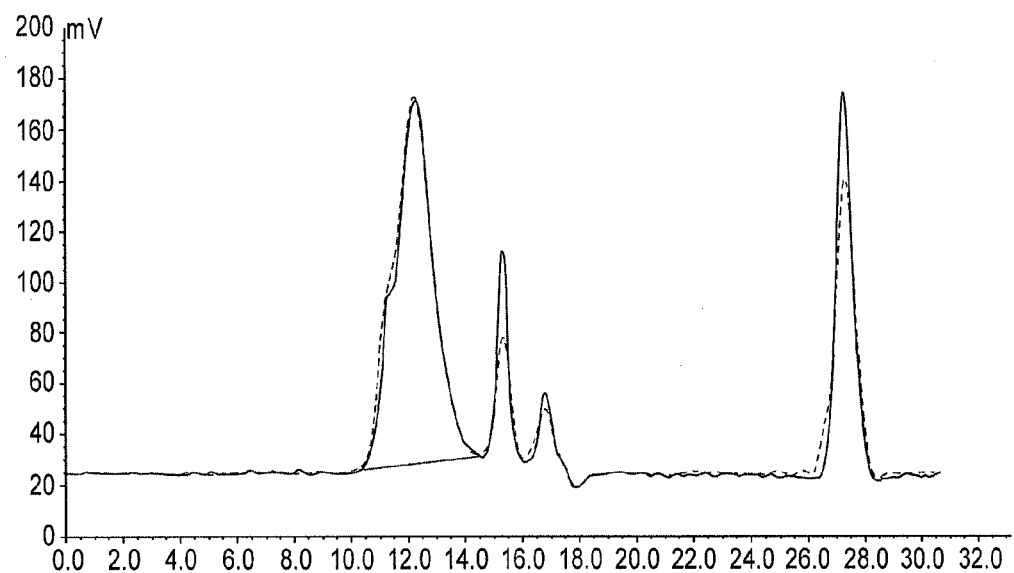
FIGURE 1 : GC spectrum of F11 before (dotted line) and after (solid line) ageing

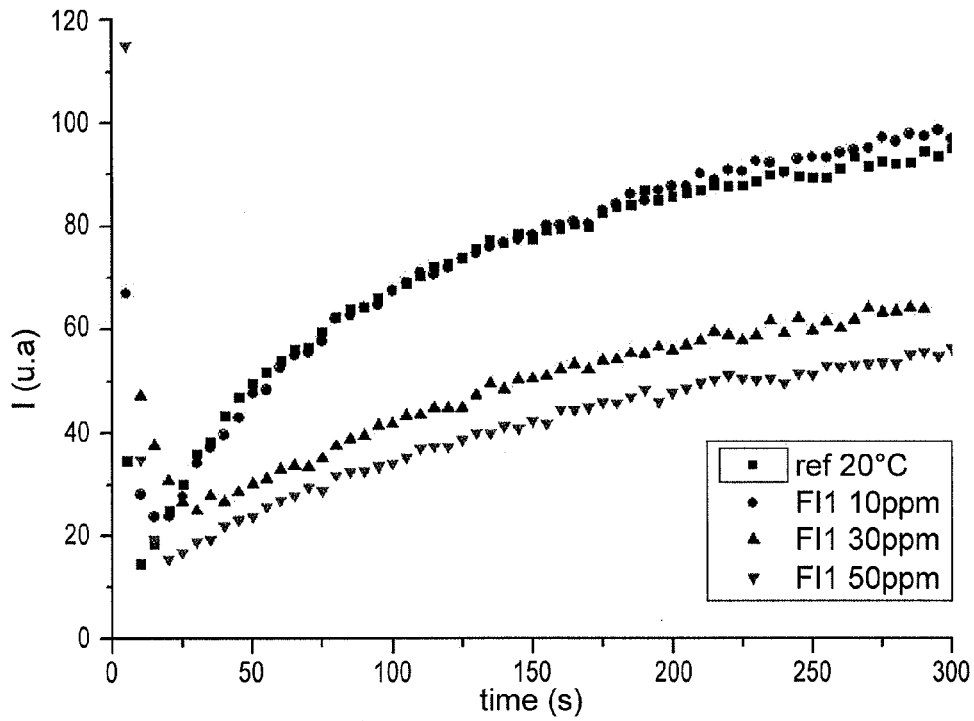
FIGURE 2A : Fl1 at 20°C (15 mg.l-1[S2-] and 130mg.l-1[Zn2+])
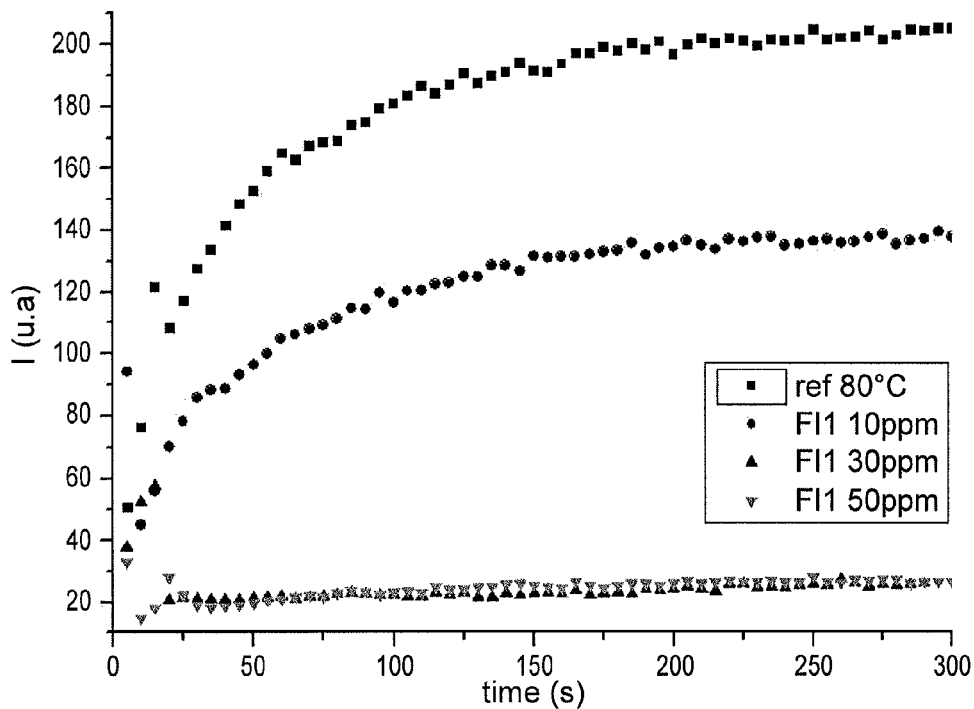
FIGURE 2B : Fl1 at 80°C (15 mg.l-1[S2-] and 130mg.l-1[Zn2+])

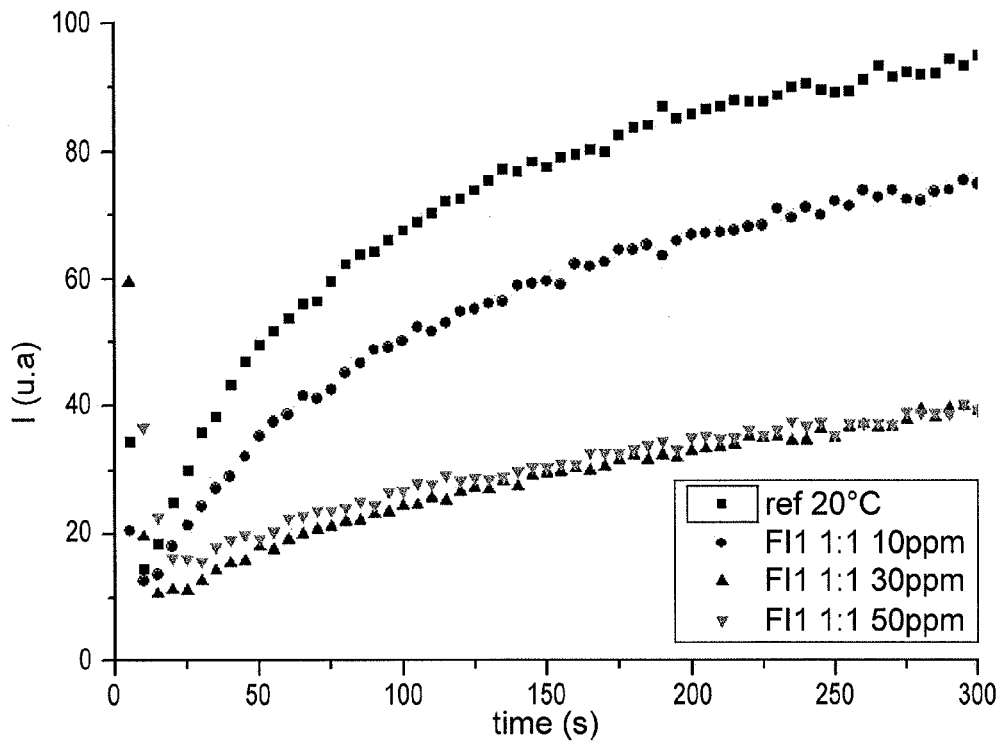
FIGURE 3A : Fl1 1:1 at 20°C (15 mg.l-1[S2-] and 130mg.l-1[Zn2+])
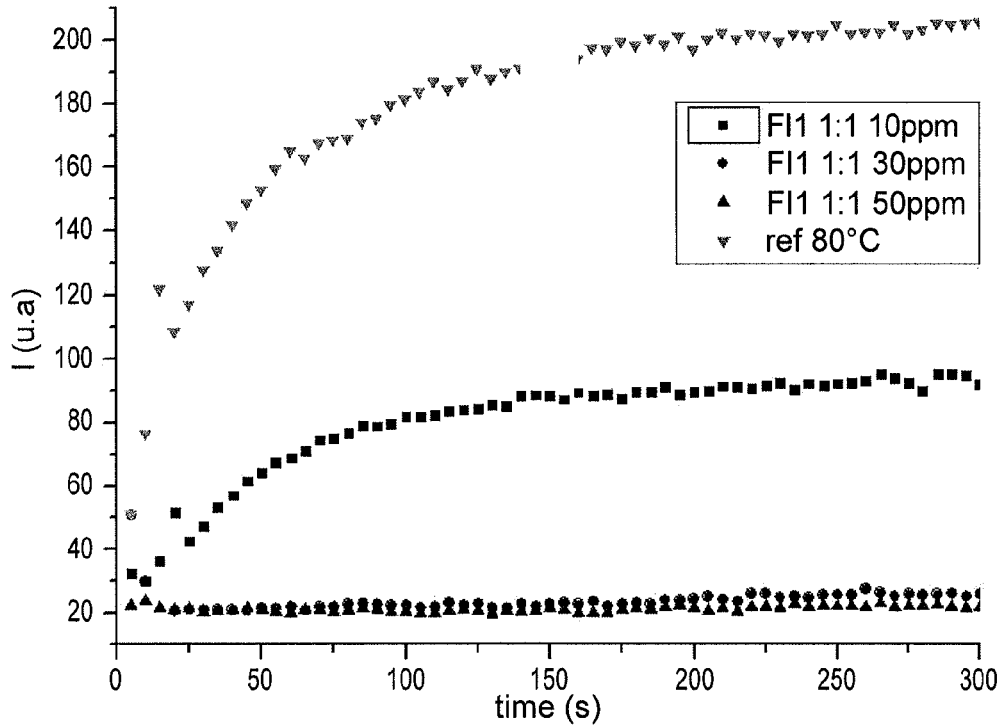
FIGURE 3B : Fl1 1:1 at 80°C (15 mg.l-1[S2-] and 130mg.l-1[Zn2+])

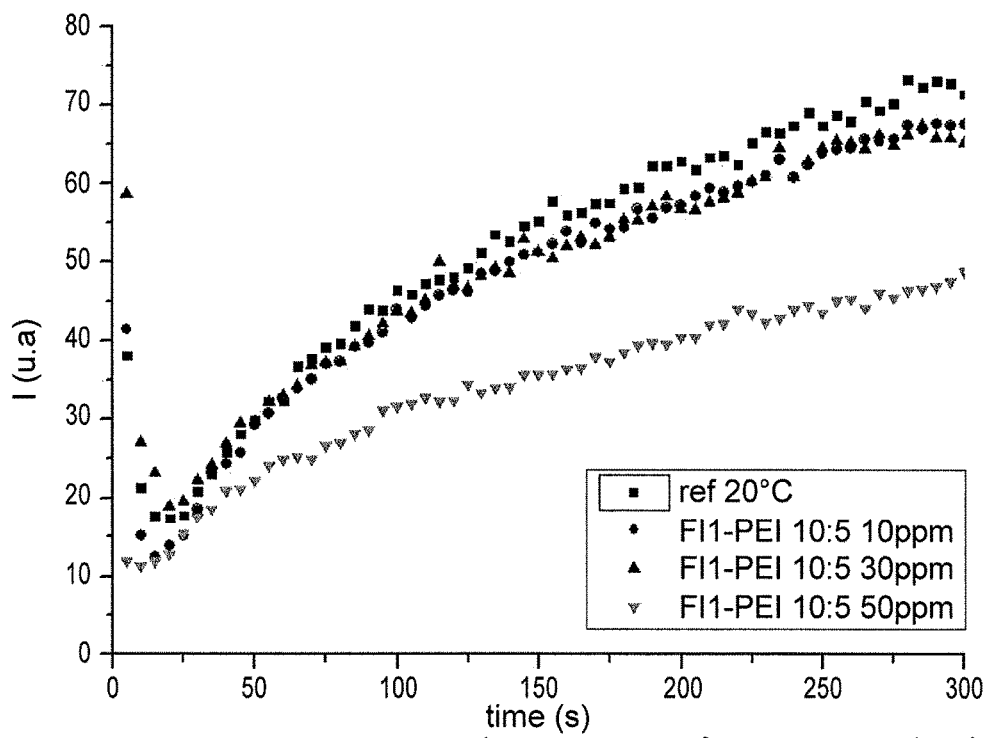
FIGURE 5A : Fl1-PEI (10:5) at 20°C (15 mg.l-1[$S^{2-}$] and 130mg.l$^{-1}$[$Zn^{2+}$])
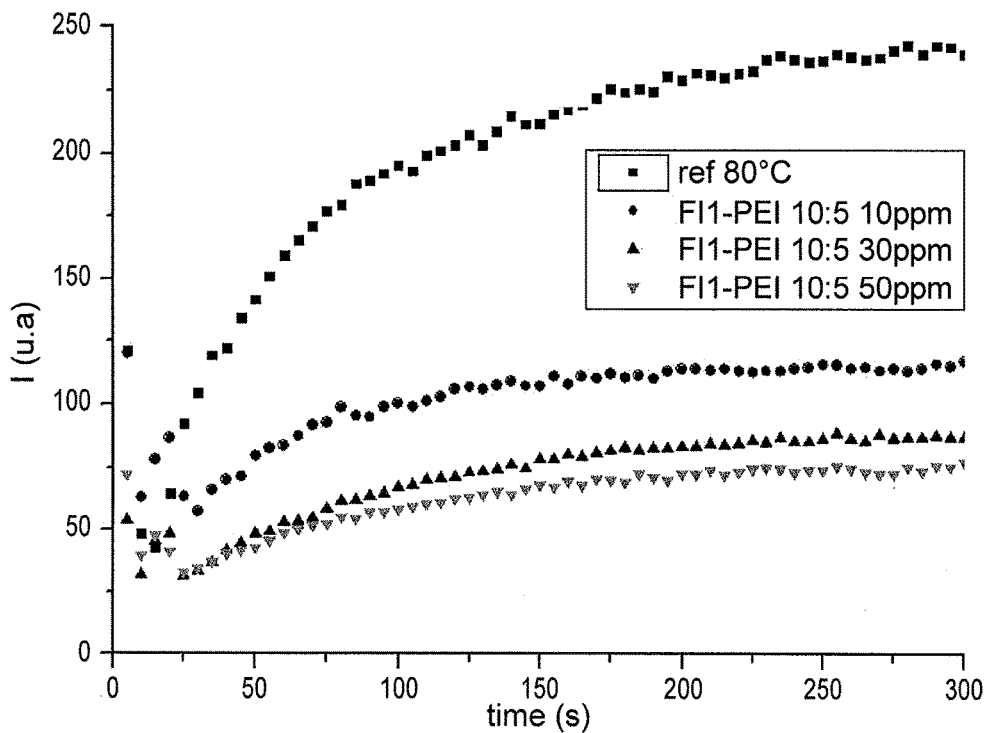
FIGURE 5B : Fl1-PEI (10:5) at 80°C (15 mg.l-1[$S^{2-}$] and 130mg.l$^{-1}$[$Zn^{2+}$])

USE OF A COPOLYMER MADE FROM STYRENE SULPHONIC ACID TO INHIBIT OR SLOW THE FORMATION OF SULPHIDE DEPOSITS

TECHNICAL FIELD

This invention relates to the use of a copolymer containing a unit comprising an optionally neutralised styrene sulphonic acid unit and a unit containing an optionally neutralised (poly)carboxylic acid unit or a (poly)amidoamine unit, to inhibit or slow the formation of sulphide deposits during the extraction of gas or oil. It also relates to a method for inhibiting or slowing the formation of sulphide deposits during the extraction of gas or oil, comprising the injection, into a wellbore, a subterranean formation or a gas or oil well, of a fluid containing the abovementioned copolymer.

BACKGROUND OF THE INVENTION

Fluids in oil production are comprised of oil, gas and water. Reservoir water can be water that is very salty containing many elements. In particular, at high temperature, the production water can contain elements such as iron, zinc or lead, coming from the rocks with which the reservoir water has been in contact for millions of years. When the gas associated with the production contains sulphides such as hydrogen sulphide, iron, zinc and/or lead sulphides can then be formed. These salts can be deposited in the immediate vicinity of the reservoir or in the production installations such as in the pipes ("tubing"). Such deposits have in particular been observed during the concomitant production of gas and of brine in the Gulf of Mexico and in the British sector of the North Sea. In order to remove them, it is necessary to clean the equipment on a regular basis, which has a negative effect on the productivity of the method.

A solution for removing these deposits consists in carrying out acid washings. In addition to their short duration of action, these treatments however are not without risk for man and the equipment, in particular in conditions of high pressure and of high temperature.

In order to overcome this problem, it is possible to inhibit the formation of the deposits by injecting inhibitors continuously, at the bottom of the well, when the installations are in place. Otherwise, the injection of the product is carried out using an injection technique called "squeeze". This technique consists in injecting a large quantity of product into the oil reservoir while production is stopped. The deposit inhibitor injected into the reservoir must be absorbed by the rock during the injection and be released progressively when production resumes, in order to prevent the formation of deposits over a long period of time, during the production of reservoir water.

Among the solutions proposed in prior art for inhibiting the formation of sulphide deposits, it has been suggested to add to the drilling fluid injected into the well an inhibiting agent able to prevent the formation of sulphide crystals, to prevent their growth or to disperse them. As such, a polymer of low molecular weight, which is a homo- or copolymer of vinyl sulphonate, was studied by M. M. JORDAN et al. in document SPE 64427 presented at the SPE Asia Pacific Conference in Brisbane (Australia), on 16 Oct. 2000. Other inhibitors have been proposed in documents U.S. Pat. No. 7,159,655 and U.S. Pat. No. 7,398,824. This entails respectively acrylamide, quaternary ammonium and possibly acrylate copolymers, and acrylamide, diallyldimethylammonium salt and possibly acrylate copolymers, which are introduced into a carrier fluid or into the brine. It is indicated that these polymers are more soluble, in high-density brines, than polymers made from acrylamidomethylpropane sulphonic acid, maleic acid and acrylic acid. Document GB-2 448 442 reports the introduction of the same type of polymer into a fracturing fluid. Document U.S. Pat. No. 5,171,459 suggests the use of alkyldiphenylether sulphonates such as the Dowfax product from DOW CHEMICAL. It has been shown that these compounds disperse the sulphide deposits better than other sulphide polymers such as a poly(vinyl sulphonate) and a vinylsulphonate/styrene/maleic anhydrous copolymer.

It was however observed that the known inhibitors of sulphide deposits were not effective for use in conditions of high pressure and high temperature. The same applies to phosphonates which are known to break down at high temperature, with the degradation products of these compounds furthermore having very low solubility in the presence of alkaline earth metal cations, which substantially reduces their use and makes it even practically impossible in reservoir at more than 150° C.

There is therefore still a need to have a compound that makes it possible to inhibit or to slow the formation of sulphide deposits, in particular zinc, iron and lead sulphides, which is stable at high temperature and high pressure and which can also be effective against the formation of other inorganic deposits or compatible with the inhibitors used for this purpose. It would furthermore be desirable that this compound can be released in a prolonged manner.

The inventors have demonstrated that these needs could be satisfied by using, as a sulphide deposit inhibitor, a particular copolymer such as a styrene sulphonic acid/anhydrous maleic copolymer. It has already been suggested to use such a copolymer as an inhibitor of non-sulphide inorganic deposits, made from calcium carbonate and from barium sulphate, in oil wells (FR 2 803 304). These deposits are generally formed during the placing into contact of the brine present in the reservoir with the fluid injected in order to recover the oil. It is commonly acknowledged that calcium sulphate or carbonate deposit inhibitors are not suitable for preventing the formation of sulphide deposits. This results in the fact that the calcium carbonate and barium sulphate bear positive surface charges, contrary to lead, iron and zinc sulphides of which the isoelectric point is less than 4 (M. Kosmulski, Journal of Colloid and Interface Science, 35, (2011), 1-15). The anionic polymers used to inhibit the formation of the first ones are therefore not adapted to develop electrostatic interactions with the second ones. As such, it was not foreseeable that the aforementioned copolymers could offer a solution to the aforementioned needs.

SUMMARY OF THE INVENTION

This invention has for object the use of a copolymer containing a unit comprising an optionally neutralised styrene sulphonic acid unit and a unit containing an optionally neutralised (poly)carboxylic acid unit or a (poly)amidoamine unit, to inhibit or slow the formation of sulphide deposits, in particular of lead, iron and/or zinc sulphides, during the extraction of gas or oil.

It also has for object a method to inhibit or slow the formation of sulphide deposits, in particular lead, iron and/or zinc sulphides, during the extraction of gas or oil, comprising the injection, into a wellbore, a subterranean formation or a gas or oil well, of a fluid containing a copolymer containing a unit comprising an optionally neutralised styrene sulphonic acid unit and a unit containing an optionally neutralised (poly)carboxylic acid unit or a (poly)amido-amine unit.

Without desiring to be bound by this theory, the inventors issued the hypothesis according to which the inhibiting effect of the copolymers according to the invention was based on a preferential complexation of the surface sites of the particles of zinc and of lead sulphide by the carboxylic acid or amido-amine functions of these copolymers and on the steric repulsion generated by the sulphonic acid functions, with these two functions contributing to slow the growth of sulphide crystals formed and therefore the kinetics of formation of precipitates of lead, iron and zinc sulphides. In practice, these precipitates therefore do not have the time to be formed in the operating conditions of a gas or oil deposit, since the exceeding of the saturation threshold remains limited in time in this type of method. The copolymers according to the invention can furthermore exert their function as an inhibitor of the formation of deposits of calcium carbonate or of barium sulphate, in particular.

DETAILED DESCRIPTION OF EMBODIMENTS

The copolymer used according to this invention can be comprised solely of units comprising (and more preferably constituted of) an optionally neutralised styrene sulphonic acid unit and units containing (and more preferably constituted of) an optionally neutralised (poly)carboxylic acid unit or at least one (poly)amido-amine unit. "(Poly)carboxylic acid unit" means a unit bearing one or several carboxylic acid functions. This unit is advantageously obtained using an unsaturated monomer bearing at least one, and more preferably two, carboxylic acid functions, chosen for example from maleic acid, fumaric acid, itaconic acid, citraconic acid, cis-1,2,3,6-tetrahydro-phthalic anhydride, with maleic acid being preferred. These carboxylic acid units can be neutralised using sodium, potassium or ammonium salts, more preferably sodium salts. The (poly)amido-amine unit can be obtained by reacting all or a portion of the carboxylic acid functions with a compound, more preferably a polymer, bearing at least two primary or secondary amine functions, which can be chosen in particular from: polyamines such as DETA (diethylene triamine), TETA (triethylene tetramine), TEPA (pentamine), dihexylene triamine and polyethyleneimine (PEI); silicone polymers, in particular polydimethylsiloxanes, functionalised by amine groups; chitosans; polypeptides and proteins more preferably DETA and PEI.

It is preferred that the molar percentage, in the copolymer according to the invention, of units containing an optionally neutralised styrene sulphonic acid unit be between 10 and 90%, more preferably between 25 and 75% and, better, between 50 and 70%.

This copolymer can contain at least one other unit chemically separate from those mentioned hereinabove and which can for example have at most 20% mol and more preferably at most 10% mol, in relation to the total number of moles of monomeric units in said copolymer. This other unit can be chosen in particular from (meth)acrylamides, (meth)acrylic acid esters, vinyl acetate, styrene and vinyltoluene.

The copolymer used according to the invention responds to the following formula:

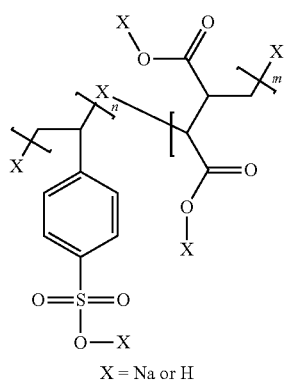

X = Na or H where $m/(m+n)=0.1-0.9$ and $n/(m+n)=0.9-0.1$, more preferably $m/(m+n)=0.25-0.75$ and $n/(m+n)=0.75-0.25$, and more preferentially $m/(m+n)=0.3-0.5$ and $n/(m+n)=0.5-0.7$.

According to a particularly preferred embodiment of the invention, all or a portion of the carboxylic acid functions of the copolymer are substituted by amido-amine functions resulting, as indicated hereinabove, from the reaction of these carboxylic acid functions with at least two primary or secondary amine functions carried by a compound which is placed in reaction with the units containing at least one (poly)carboxylic acid unit of the copolymer according to the invention. It has indeed been observed that these copolymers had improved properties for inhibiting the formation of sulphide deposits. It is thought that these copolymers make it possible to obtain a prolonged inhibiting effect, via the progressive hydrolysis of the amide functions, and also more effective, in that the lone pair of the nitrogen atom of the amine functions not having participated in the amide bonds is useful in complexing the surface sites of the particles of zinc and lead sulphide. These copolymers with amido-amine functions also limit the interactions between the (poly) carboxylic acid units and deposits of barium sulphate or of calcium carbonate for example, which can make it possible to prevent the copolymer from reacting exclusively with these deposits which tend, in certain conditions, to be formed before the sulphide deposits.

The copolymer used according to the invention has in general an average molecular mass between 10 and 50 kDa.

This copolymer can be obtained according to the conventional methods of radical polymerisation in aqueous or hydro-alcoholic solutions and with an acidic pH. It is also available off the shelf from ALDRICH or AKZO NOBEL.

Due to its good thermal resistance, the polymer according to the invention can be used in particular in oil wells operating at high pressure, i.e. at more than 10 MPa, for example from 20 to 150 MPa, and at high temperature, i.e. from 150 to 250° C., for example from 200 to 230° C.

This polymer can be injected into the well in the form of an additive in a drilling fluid. This drilling fluid can contain from 1 to 10 ppm of the polymer described hereinabove.

Alternatively, the polymer described hereinabove can be injected into the well as "squeeze", i.e. according to a method that consists in rinsing the well with sea water, then in injecting into the well a fluid containing this polymer and in introducing again sea water into the well in order to disperse the polymer in the reservoir and allow it to be adsorbed on the underground rock formations. During this treatment, the operations of extracting the oil are interrupted and, when they are resumed, the polymer will be released progressively from the rock formations in order to prevent or slow the formation of sulphide deposits. In this alternative, the fluid injected can contain about 10% by weight of the polymer described hereinabove.

In any case, the fluid conveying the copolymer according to the invention can furthermore comprise other additives such as corrosion inhibitors, paraffin inhibitors, surfactants or demulsifiers, dispersants, in particular dispersants of asphaltene, foaming agents or anti-foaming agents, biocidal agents, oxygen collectors, chelating agents such as EDTA and DTPA, and mixtures thereof.

According to an advantageous embodiment of the invention, this fluid furthermore contains at least one polymer bearing amine functions, such as the polyamines mentioned hereinabove, in particular DETA or PEI, silicone polymers bearing amine functions, and mixtures thereof.

This invention shall be better understood by way of the following non-limiting examples, which are provided solely for the purposes of information and which do not have for purpose to limit the scope of this invention which is defined by the annexed claims.

FIGURES

FIG. 1 shows the GC spectrum of the inhibitor F11 before and after ageing

Figure 6:
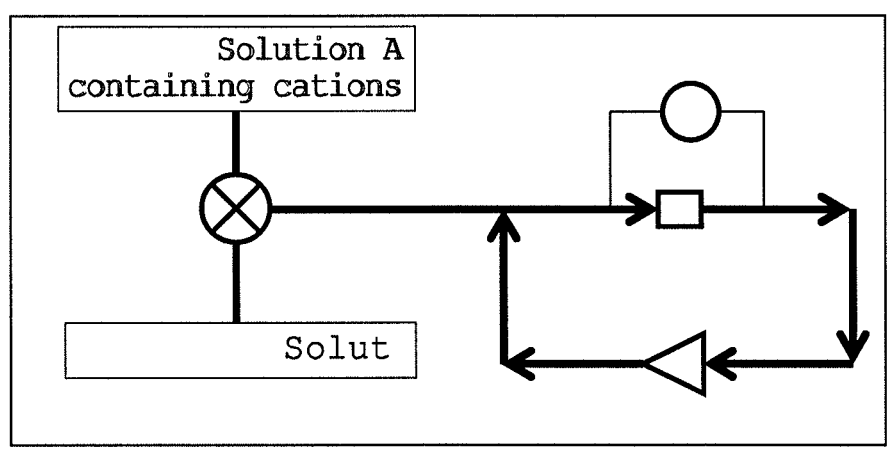

FIG. 2 shows the change in the intensity of the fluorescence at 414 nm with the inhibitor F11 at two different temperatures FIG. 3 shows the change in the intensity of the fluorescence at 414 nm with the inhibitor F11 at two different temperatures FIG. 4 shows the change in the intensity of the fluorescence at 414 nm with the inhibitor F11-DETA FIG. 5 shows the change in the intensity of the fluorescence at 414 nm with the inhibitor F11-DETA at two different temperatures FIG. 6 shows the devices used for the implementation of the Tube Blocking Test

EXAMPLES

I/ Preparation of Inhibiting Solutions

Example 1: Preparation of an Inhibiting Solution of Poly(Sodium 4-Styrenesulphonate)

The polymer, purchased from Sigma Aldrich (CAS: 25704-18-1; $(C_8H_7NaO_3S)_n$), has a molar mass of about 100 kDa. Ten grams of poly(sodium 4-styrenesulphonate) are weighed in a 100 mL bottle. The mass is then adjusted to 100 grams by adding ultra-pure water. The pH is then about 8.7. The pH is then adjusted to 4.5 by successive addings of 6M hydrochloric acid.

Example 2: Preparation of an Inhibiting Solution of Sodium Salt of Poly(4-Styrenesulphonic Acid-Co-Maleic Acid) (or F11)

The polymer, purchased from Sigma Aldrich (CAS: 68037-40-1; $[CH2CH(C6H4SO3R)]_x[CH(CO2R)CH(CO2R)]_y$, R=H or Na), has a molar mass of about 20 kDa. The polymer has a ratio of three styrene sulphonic acid functions for one maleic acid function. Ten grams of F11 are weighed in a 100 mL bottle. The mass is then adjusted to 100 grams by adding ultra-pure water. The pH of about 7.5, is adjusted to 4.5 by successive addings of 6M hydrochloric acid.

Example 3: Preparation of an Inhibiting Solution of Sodium Salt of Poly(4-Styrenesulphonic Acid-Co-Maleic Acid) (or F11b)

The polymer, purchased from Sigma Aldrich (CAS: 68037-40-1; $[CH2CH(C6H4SO3R)]_x[CH(CO2R)CH(CO2R)]_y$, R=H or Na), has a molar mass of about 20 kDa. The polymer has an equimolar ratio of styrene sulphonic acid and maleic acid functions. Ten grams of F11b are weighed in a 100 mL bottle. The mass is then adjusted to 100 grams by adding ultra-pure water. The pH of about 7.5 is adjusted to 4.5 by successive addings of 6M hydrochloric acid.

Example 4: Preparation of an Inhibiting Solution of F11-DETA

In a 100 mL bottle, 10 g of F11, obtained according to example 2, is reacted with 2 g of diethylenetriamine with a molar mass of 103.17 g·mol$^{-1}$ purchased from Sigma Aldrich (CAS: 111-40-0; $(NH_2CH_2CH_2)$ 2NH). The pH of about 11 is adjusted to 4.5 by adding 6M HCl.

Example 5: Preparation of an Inhibiting Solution of F11-PEI

In a 50 mL single neck flask, 10 g of F11 are placed in the presence of 10 mL of a solution of polyethylenimine or PEI (CAS 9002-98-6) at 50% by weight. The flask is topped with a refrigerant and placed under stirring. 40 mL of ultra-pure water are then added. The whole is heated to 80° C. for 3 h, then 40 mL of ultra-pure water are added and the mixture is kept at temperature for 24 h. After returning to ambient temperature, the contents of the flask are dispersed in 100 mL of ultra-pure water in order to give a product with a milky aspect at 5% by weight of F11 and 2.5% of PEI. The pH is adjusted to 4.5 using 1.2 M HCl.

II/ Evaluation of the Thermal Ageing of the Inhibiting Solutions

These tests are carried out over a period of five days. Nitrogen is bubbled beforehand in the samples in order to remove the oxygen. The tests are carried out in anaerobic conditions under a temperature of 200° C. and a nitrogen pressure of about 1000 psi applied all throughout the ageing. In order to determine the stability of the products analysed under such conditions, the variations in pressure are studied as a function of time. An increase in the pressure reveals indeed a gaseous release linked to a likely decomposition of the product. The change in aspect of the solutions (precipitation, change in colour, etc.) can also provide information on the stability of the products tested. A measurement of the pH can be taken before and after ageing. An analysis of the products via GC before and after ageing can also reveal the stability of the products.

Example 6: Ageing of the F11

In a reactor under nitrogen pressure (~1000 psi) are placed in a glass cell 70 mL of the solution of F11 of example 2 wherein nitrogen was bubbled beforehand. After ageing at 200° C. for five days, the F11 undergoes an increase of about one pH unit (from 4.3 to 5.4). As shown in FIG. 1, analyses via gas-phase chromatography (GC) before and after ageing do not show any change in the product (no displacement or appearance of peaks), which moreover retains the same aspect (dark yellow solution). The Fl1 is therefore thermally stable.

Example 7: Ageing of the Fl1-DETA

In a reactor under nitrogen pressure (~1000 psi) are placed in a glass cell, 70 mL of the solution of Fl1-DETA of example 4 wherein nitrogen was bubbled beforehand. After ageing at 200° C. for five days, the Fl1-DETA undergoes an increase of about three units of pH (from 5.56 to 8.25). Analyses via gas-phase chromatography (GC) before and after ageing do not show any change in the product (no displacement or appearance of peaks) which moreover retains the same aspect (dark yellow solution). The Fl1-DETA is therefore thermally stable.

III/ Evaluation of the Inhibiting Effect Via Fluorimetry

A solution of sulphur is prepared at two concentrations (100 mg·L$^{-1}$ and 200 mg·L$^{-1}$) of sulphur by dilution of Na$_2$S.9H$_2$O (Aldrich, 98 wt %) in ultra-pure water. The content of the flask is poured into an Erlenmeyer flask provided with a serum cap through which a pH meter continuously measures the pH of the solution. The whole is placed under mechanical stirring. Additions of a solution of 0.12M HCl are carried out using a syringe via the serum cap in order to reach a pH of 5.5. The solution is then distributed using a syringe in sealed 15 mL bottles provided with serum caps. The samples are stored for a maximum period of one week at 5° C.

A zinc solution is prepared at 150 mg·L$^{-1}$ of zinc by dissolution of 157 mg of ZnCl$_2$ (Aldrich, 98 wt %) in a 500 mL graduated flask using a saline solution (25 g·L$^{-1}$ [Na$^+$] and 5 g·L$^{-1}$ [Ca$^{2+}$]). The pH of the solution is adjusted to 4.5 by successive addings of a solution of 0.12M HCl.

The inhibitors are prepared at 5% by weight in water and the pH is adjusted to 4.5 using a solution of 0.12M and 12M HCl. The inhibitors are then added at different concentrations (10, 30, 50 and 100 ppm) to the zinc solution prepared hereinabove. The pHs are controlled and readjusted if needed using 0.12M HCl or 0.1M NaOH.

The measurements are taken using a Varian Cary Eclipse spectrofluorimeter. The fluorescence of the ZnS is first of all evaluated by analysis of a control sample wherein Zinc is placed in the presence of sulphur without particular saline conditions. The standard analysis conditions include λexc=414 nm and λem=434 nm. Variations in the concentration of sulphur over time, linked to the release of hydrogen sulphide, require changing the capsule every half a dozen measurements, as well as carrying out frequent references between the measurements. The analyses are first carried out at ambient temperature (20° C.) then at 80° C. They are carried out in PMMA cuvettes.

Three milliliters of the zinc solution are placed in the presence of 0.5 mL of one of the sulphur solutions prepared and an analysis is carried out, which acts as a reference. Afterwards, 3 mL of the solution containing the inhibitor, at the desired concentration, and zinc chloride (to be confirmed), are rapidly placed in presence with 0.5 mL of one of the sulphur solutions, before launching the analysis. In the case of tests at 80° C., the samples are placed for one hour in an oven at 80° C. The analyses are then carried out by using a thermostatically-controlled sample holder set to 80° C. The samples are excited at 414 nm, and the fluorescence spectrum is recorded between 425 nm and 450 nm.

Example 8: Following the Inhibitor Effect of ZnS of the Fl1

Five milliliters of the solution of Fl1 of example 2 are placed in a 10 mL bottle to which are added 5 mL of ultra-pure water. A solution at 5% by weight of Fl1 is then obtained. The pH of this solution is adjusted to 4.5 by addings of 6M HCl. After which, 2, 6 and 10 µL of this solution are placed using a micropipette in 10 mL bottles. Into each bottle are then added respectively 9998, 9994 and 9990 µL of the zinc solution described hereinabove in order to obtain three solutions at 10, 30 and 50 ppm of Fl1. The pH of the solutions is adjusted to 4.5 if needed by addings of 0.12M HCl. The solutions are then analysed at ambient temperature then at 80° C. according to the protocol described hereinabove, with a sulphur solution at 100 mg·L$^{-1}$. The fluorescence curves obtained are shown in FIG. 2. As can be seen in this figure, the Fl1 clearly slows the growth of the ZnS in these conditions. The inhibitory effect of the latter seems exacerbated in conditions of higher temperatures.

Example 9: Following the Inhibitor Effect of ZnS of the Fl1b

Five milliliters of the solution of Fl1b of example 3 are placed in a 10 mL bottle to which are added 5 mL of ultra-pure water. A solution at 5% by weight of Fl1 is then obtained. The pH of this solution is adjusted to 4.5 by addings of 6M HCl. After which, 2, 6 and 10 µl of this solution are placed using a micropipette in 10 mL bottles. Into each bottle are then added respectively 9998, 9994 and 9990 µl of the zinc solution described hereinabove in order to obtain three solutions at 10, 30 and 50 ppm of Fl1b. The pH of the solutions is adjusted to 4.5 if needed by addings of 0.12M HCl. The solutions are then analysed at ambient temperature then at 80° C. according to the protocol described hereinabove, with a sulphur solution at 100 mg·L$^{-1}$. The fluorescence curves obtained are shown in FIG. 3. As can be seen in this figure, the Fl1b clearly slows the growth of the ZnS in these conditions. The inhibitory effect of the latter seems exacerbated in conditions of higher temperatures.

Example 10: Following the Inhibitor Effect of ZnS of the Fl1-DETA

Five milliliters of the solution of Fl1-DETA of example 4 are placed in a 10 mL bottle to which are added 5 mL of ultra-pure water. A solution at 5% by weight of Fl1-DETA (10:2) is then obtained. The pH of this solution is adjusted to 4.5 by addings of 6M HCl. After which, 1, 4 and 10 µL of this solution are placed using a micropipette in 10 mL bottles. Into each bottle are then added respectively 9999, 9996 and 9990 µL of the zinc solution described hereinabove in order to obtain three solutions at 5, 20 and 50 ppm of Fl1-DETA. The pH of the solutions is adjusted to 4.5 if needed by addings of 0.12M HCl. The solutions are then analysed at ambient temperature according to the protocol described hereinabove 11 with a sulphur solution at 100 mg·L$^{-1}$. The fluorescence curves obtained are shown in FIG. 4. As can be seen in this figure, a decrease in the growth of the zinc sulphide is observed with the increase in the concentration of Fl1-DETA (10:2). The Fl1-DETA clearly inhibits the formation of the ZnS.

Example 11: Following the Inhibitor Effect of ZnS of the Fl1-PEI

Five milliliters of the solution of Fl1-PEI are placed in a 10 mL bottle to which are added 5 mL of ultra-pure water. A solution at 5 by weight of Fl1-PEI (10:5) is then obtained. The pH of this solution is adjusted to 4.5 by addings of 6M HCl. After which, 2, 6 and 10 μl of this solution are placed using a micropipette in 10 mL bottles. Into each bottle are then added respectively 9998, 9994 and 9990 μL of the zinc solution described hereinabove in order to obtain three solutions at 5, 30 and 50 ppm of Fl1-PEI. The pH of the solutions is adjusted to 4.5 if needed by addings of 0.12M HCl. The solutions are then analysed at ambient temperature according to the protocol described hereinabove with a sulphur solution at 100 mg·L$^{-1}$. The fluorescence curves obtained are shown in FIG. 5. As can be seen in this figure, the Fl1-PEI has an inhibitory effect on the zinc sulphide at ambient temperature. This inhibiting power is exacerbated in conditions of higher temperatures.

IV/ Evaluation of the Inhibitory Effect Via the Tube Blocking Test

Two saline solutions containing metal cations (A) and sulphur (B) are mixed then pass into the tube where a deposit is formed. The tube is provided with a filter. When the deposit is formed in the tubes, their inner surface decreases and the filter becomes clogged, which results in an increase in the differential pressure. The inhibitors are mixed in solution A and are tested between 5 and 30 ppm. An analysis of the filter by SEM then by EDX makes it possible to obtain accurate information on the quantity and the nature of the deposits formed.

The device used is shown in the annexed FIG. 6.

The tests are carried out with a solution B which is always the same, but with solutions A that can contain elements of different natures, summarised in Table 1.

TABLE 1

Experimental conditions of the Tube Blocking Test

| Ion | Solution A1 (mg/l) | Solution A2 (mg/l) | Solution A3 (mg/l) | Solution A4 (mg/l) | Solution A5 (mg/l) | Solution B (mg/l) |
|---|---|---|---|---|---|---|
| Na | 63310 | 63310 | 29505 | 63310 | 63310 | 117576 |
| Ca | 37318 | 37318 | 7223 | 37318 | 37318 | 0 |
| Mg | 2174 | 2174 | 511 | 2174 | 2174 | 0 |
| K | 21198 | 21198 | 0 | 21198 | 21198 | 0 |
| Ba | 4946 | 4946 | 0 | 4946 | 4946 | 0 |
| Sr | 4480 | 4480 | 0 | 4480 | 4480 | 0 |
| Fe | 900 | 0 | 0 | 0 | 450 | 0 |
| Pb | 100 | 0 | 0 | 50 | 0 | 0 |
| Zn | 300 | 300 | 200 | 0 | 300 | 0 |
| S | 0 | 0 | 0 | 0 | 0 | 10 |

Example 12: Following of the Inhibiting Effect of ZnS of the Poly(Sodium 4-Styrenesulphonate) (PSS)

In order to carry out these tests, the solutions containing the PSS used are made from the solution A3 of Table 1, to which are added quantities of the solution of PSS of example 1. The solutions then obtained are at 30, 50 and 100 ppm of PSS. They are co-injected with the solution B of Table 1, via a tube made of an alloy (Ni$_{72}$Cr$_{16}$Fr$_8$) of 1 mm in outer diameter and of 0.8 mm in inner diameter. The two solutions then pass through a 7 μm filter. The solutions are injected at a flow rate of 10 mL/min. A differential measurement of the pressure is taken between the inlet and the outlet of the filter. The tests are carried out at 125° C. and under a pressure of 45 bar. The results obtained are gathered together in Table 2 hereinbelow.

TABLE 2

Results of the Tube Blocking Test for PSS

| Concentration (mg/L) | ΔP (psi) | Deposits observed |
|---|---|---|
| Filter | N/A | No deposit (Fe, Cr, Ni of the filter) |
| 0 | 3.4 | Much ZnS |
| 30 | 3.2 | Much ZnS (comparable to the blank) |
| 50 | 2.9 | Much ZnS (comparable to the blank) |
| 100 | 3.5 | Much ZnS (comparable to the blank) |

These results show that the PSS does not have an inhibiting effect of the formation of deposits of ZnS.

Example 13: Following the Inhibitor Effect of ZnS of the Fl1

In order to carry out these tests, the solutions containing the Fl1 used are made from the solution A2 of Table 1, to which are added quantities of the solution of Fl of example 2. The solutions obtained are at 5, 10, 30 and 100 ppm. They are co-injected with the solution B of Table 1, via a tube made of an alloy (Ni$_{72}$Cr$_{16}$Fr$_8$) of 1 mm in outer diameter and of 0.8 mm in inner diameter. The two solutions then pass through a 7 μm filter. The solutions are injected at a flow rate of 10 mL/min. A differential measurement of the pressure is taken between the inlet and the outlet of the filter. The tests are carried out at 125° C. and under a pressure of 45 bar. The results are gathered together in Table 3 hereinbelow.

TABLE 3

Results of the Tube Blocking Test for the Fl1

| Concentration (mg/l) | ΔP (psi) | Deposits observed |
|---|---|---|
| Filter | N/A | No deposit (Fe, Cr, Ni of the Filter) |
| 0 | 3.3 | Partially covered with ZnS |
| 5 | 1.2 | Less ZnS than in the blank |
| 10 | 1 | Traces of ZnS |
| 30 | 0 | Traces of ZnS |
| 100 | 0 | Traces of ZnS |

In these conditions, the Fl1 is active from 5 ppm. Indeed, from this concentration, the Fl1 slows the growth of the ZnS.

Example 14: Following the Inhibitor Effect of ZnS of the Fl1-DETA

In order to carry out these tests, the solutions containing the Fl1-DETA used are made from the solution A2 of Table 1, to which are added given quantities of the solution of Fl1-DETA of example 4. The solutions obtained are at 1, 3, 5, 10 and 30 ppm of Fl1-DETA. They are co-injected with the solution B of Table 1, via a tube made of an alloy (Ni$_{72}$Cr$_{16}$Fr$_8$) of 1 mm in outer diameter and of 0.8 mm in inner diameter. The two solutions then pass through a 7 μm filter. The solutions are injected at a flow rate of 10 mL/min. A differential measurement of the pressure is taken between the inlet and the outlet of the filter. The tests are carried out at 125° C. and under a pressure of 45 bar. The results obtained are gathered together in Table 4 hereinbelow.

TABLE 4

Results of the Tube Blocking Test for F11-DETA

| Concentration (mg/l) | ΔP (psi) | Deposits observed |
|---|---|---|
| Filter | N/A | No deposit (Fe, Cr, Ni of the Filter) |
| 0 | 3.2 | Partially covered with ZnS |
| 1 | 2.7 | Less ZnS than in the blank |
| 3 | 0 | Traces of ZnS |
| 5 | 0 | Traces of ZnS |
| 10 | 0 | Traces of ZnS |
| 30 | 0 | Traces of ZnS |

In these conditions, the F11-DETA is active from 3 ppm. Indeed, from this concentration, no increase in pressure is observed, which reveals the absence of a formation of a ZnS deposit.

The invention claimed is:

1. Method for inhibiting or slowing the formation of sulphide deposits during the extraction of gas or oil, comprising:
    injecting a fluid containing a copolymer into a wellbore, a subterranean formation, or a gas or oil well containing sulphides,
    wherein the copolymer contains a unit comprising a styrene sulphonic acid unit and a unit containing a (poly)carboxylic acid unit or a (poly)amido-amine unit,
    wherein the (poly)carboxylic acid unit is obtained using an unsaturated monomer bearing at least one carboxylic acid function selected from the group consisting of maleic acid, fumaric acid, itaconic acid, citraconic acid, and cis-1,2,3,6-tetrahydrophthalic anhydride;
    wherein the styrene sulphonic acid unit and the (poly)carboxylic acid unit are capable of being neutralized, independently of each other, to form a salt; and
    wherein a molar percentage, in the copolymer, of units containing the styrenesulphonic acid unit is between 10 and 90%.

2. Method according to claim 1, wherein the (poly)amido-amine unit is obtained by reacting all or a portion of the carboxylic acid functions with a compound bearing at least two primary or secondary amine functions, the compound being selected from the group consisting of DETA (diethylene triamine), TETA (triethylene tetramine), TEPA (tetraethylene pentamine), dihexylene triamine, polyethyleneimine (PEI), silicone polymers functionalised by amine groups, chitosans, polypeptides, and proteins.

3. Method according to claim 1, wherein the copolymer is solely constituted of units comprising the styrene sulphonic acid unit and units containing the (poly)carboxylic acid unit or the (poly)amido-amine unit.

4. Method according to claim 1, wherein the copolymer has an average molecular mass between 10 and 50 kDa.

5. Method according to claim 1, wherein the fluid is injected into an oil well operating at more than 10 MPa, and at 150 to 250° C.

6. Method according to claim 1, wherein the styrene sulphonic acid unit is neutralized to form a salt.

7. Method according to claim 1, wherein the styrene sulphonic acid unit is not neutralized to form a salt.

8. Method according to claim 1, wherein the (poly) carboxylic acid unit is neutralized to form a salt.

9. Method according to claim 1, wherein the (poly) carboxylic acid unit is not neutralized to form a salt.

* * * * *